United States Patent
Quinn et al.

(10) Patent No.: US 9,967,330 B2
(45) Date of Patent: May 8, 2018

(54) VIRTUAL RESOURCE BANK FOR LOCALIZED AND SELF DETERMINED ALLOCATION OF RESOURCES

(71) Applicant: Dell Products L.P., Round Rock, TX (US)

(72) Inventors: Liam B. Quinn, Austin, TX (US); Steven P. Zessin, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 345 days.

(21) Appl. No.: 14/955,877

(22) Filed: Dec. 1, 2015

(65) Prior Publication Data

US 2017/0155710 A1    Jun. 1, 2017

(51) Int. Cl.
*G06F 9/50* (2006.01)
*H04L 29/08* (2006.01)

(52) U.S. Cl.
CPC ........ *H04L 67/1014* (2013.01); *G06F 9/5055* (2013.01); *H04L 67/101* (2013.01)

(58) Field of Classification Search
None
See application file for complete search history.

(56) References Cited

U.S. PATENT DOCUMENTS

| | | | |
|---|---|---|---|
| 2003/0167329 A1* | 9/2003 | Kurakake | G06F 9/5044 709/226 |
| 2005/0273511 A1* | 12/2005 | Ferreira de Andrade | G06F 9/5027 709/227 |
| 2009/0183168 A1* | 7/2009 | Uchida | G06F 9/5027 718/104 |
| 2011/0295998 A1* | 12/2011 | Ferris | G06F 9/5072 709/224 |
| 2012/0311106 A1* | 12/2012 | Morgan | H04L 41/0806 709/220 |
| 2013/0173621 A1 | 7/2013 | Kapoor et al. | |
| 2013/0201029 A1* | 8/2013 | Kung | H01L 29/0649 340/870.01 |
| 2014/0241354 A1 | 8/2014 | Shuman et al. | |
| 2014/0244833 A1 | 8/2014 | Sharma et al. | |

(Continued)

OTHER PUBLICATIONS

Dell, Inc., Massively Connected—The Evolving Internet of Things and Pervasive Computing Ecosystems, pp. 2-3, (Dell Software, 2014), 8 pages.

*Primary Examiner* — Natisha D Cox
(74) *Attorney, Agent, or Firm* — Jackson Walker L.L.P.

(57) ABSTRACT

A resource management and allocation method includes detecting a resource request, from a requesting device, requesting a particular resource for a particular time interval and one or more responses to the resource request from other devices within a device group. A master arbiter of the device group identifies a particular response to fulfill the resource request and broadcasts a confirmation of the particular response and the corresponding resource allocation. The resource allocation is recording in a virtual resource bank to indicate the allocation of the particular resource by the particular device for the particular time interval. The device group may constitute a group of Internet of Things (IoT) devices and the master arbiter be implemented by an edge gateway device associated with the device group. The types of resources the IoT devices may possess include processing, storage, sensor, and connectivity resources.

20 Claims, 5 Drawing Sheets

(56) References Cited

U.S. PATENT DOCUMENTS

| | | |
|---|---|---|
| 2014/0244834 A1 | 8/2014 | Guedalia et al. |
| 2015/0006719 A1 | 1/2015 | Gupta et al. |
| 2015/0007273 A1 | 1/2015 | Lin |
| 2015/0121470 A1 | 4/2015 | Rongo et al. |
| 2015/0130957 A1 | 5/2015 | Berelejis et al. |
| 2015/0134954 A1 | 5/2015 | Walley et al. |
| 2015/0149563 A1* | 5/2015 | Shaw ................. H04L 65/40 709/206 |
| 2015/0156266 A1 | 6/2015 | Gupta |
| 2015/0163289 A1 | 6/2015 | Paul et al. |
| 2015/0181505 A1 | 6/2015 | Deng et al. |
| 2015/0281240 A1 | 10/2015 | Kim et al. |
| 2015/0281392 A1 | 10/2015 | Kim et al. |
| 2015/0296022 A1 | 10/2015 | Kim et al. |
| 2015/0296043 A1 | 10/2015 | Kim et al. |
| 2015/0312351 A1 | 10/2015 | Wang et al. |

* cited by examiner

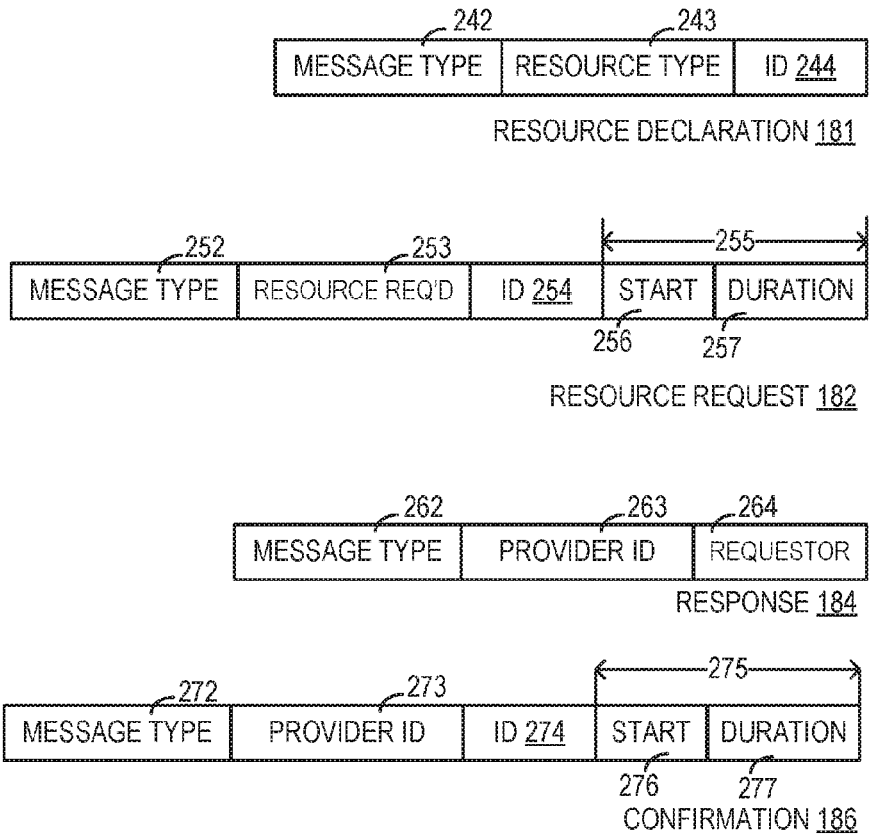
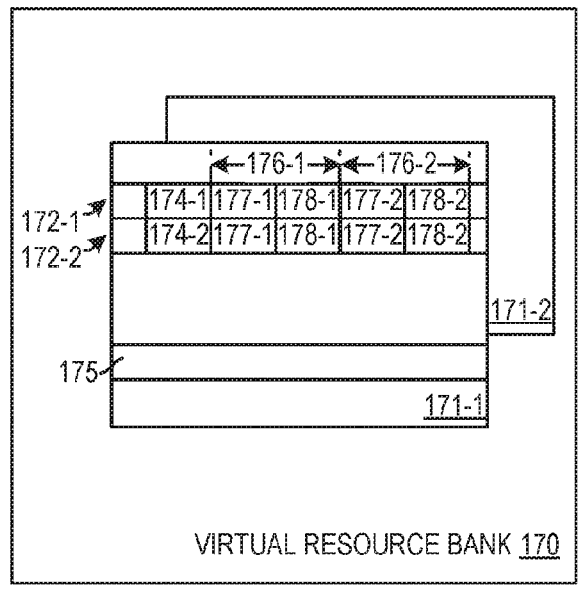
FIG. 5
FIG. 6

VIRTUAL RESOURCE BANK FOR LOCALIZED AND SELF DETERMINED ALLOCATION OF RESOURCES

TECHNICAL FIELD

Disclosed subject matter is in the field of computer networks and, more particularly, computer networks that enable sharing and allocation of computing resources.

BACKGROUND

As the value and use of information continues to increase, individuals and businesses seek additional ways to process and store information. Information handling systems represent one option available to users. An information handling system generally processes, compiles, stores, and/or communicates information or data for business, personal, or other purposes thereby allowing users to take advantage of the value of the information.

Because information handling needs and requirements vary between different users or applications, information handling systems may also vary regarding what information is handled, how the information is handled, how much information is processed, stored, or communicated, and how quickly and efficiently the information may be processed, stored, or communicated. Variations in information handling systems allow for information handling systems to be general or configured for a specific user or specific use such as financial transaction processing, airline reservations, enterprise data storage, or global communications. Information handling systems may also include a variety of hardware and software components that may be configured to process, store, and communicate information and may include one or more computer systems, data storage systems, and networking systems.

An Internet of Things (IoT) device is a type of information handling system particularly suitable for IoT environments and applications. The Internet of Things refers to dynamic configurations of objects with embedded technologies capable of communicating over public and private networks, and capable of bidirectional interactions with the environment individually or as organized systems. See, e.g., Dell, Inc., *Massively Connected—The Evolving Internet of Things and Pervasive Computing Ecosystems*, pp. 2-3, (Dell Software, 2014) (hereinafter "Massively Connected"), which is incorporated by reference herein in its entirety. The emergence of the IoT is attributable to a convergence of evolving computational and communications technology with advances in software, data analytics and mobility. The IoT environment is spreading rapidly as people, organizations and existing systems assimilate its constituent technologies into their daily activities, applications, and business practices. Id. Not amenable to concise or formulaic definition, the IoT encompasses smart systems establishing networks of devices that communicate to collect data and interact with the surrounding environment. Id. Smarter devices, software, and networking technologies enable unprecedented opportunities for monitoring, controlling, and managing objects.

IoT devices may be referred to herein by various alternative names and designations including, without limitation, smart devices and smart sensors. Because IoT devices are frequently encountered at the architectural and conceptual edge of traditional networks, IoT devices may sometimes be referred to herein as network edge devices, platforms, actuators or embedded control points and systems.

An array of technological and social advances are contributing to the growth of the IoT. The launch of IPv6 in June of 2012 enabled billions of new devices to connect to the Internet, each with their own individual address designation. Mobile access and high-speed wireless connectivity have become ubiquitous, extending to ever-more remote locations. Smaller, cheaper, and better performing sensors and smart controllers can efficiently acquire data from the physical environment to help optimize operations and increase productivity. In addition, people are becoming increasingly comfortable using technology both at home and at work or school and the cost of deploying sophisticated personal technologies is falling steeply even as improvements to attributes such as battery life and functionality accelerate. Finally, high performance and cloud computing combined with powerful new tools for data analysis and software-defined infrastructure reap the benefits of and provide justification for the data collected by these billions of connected objects.

Nevertheless, the rapidly increasing availability, diversity, capability, and affordability of IoT devices in a wide range of applications and environments may make it difficult to determine the current and future availability of capabilities and resources offered within any local group of two or more IoT devices, potentially resulting in an unbalanced and unpredictable workload architecture.

Additionally, traditional load balancing approaches may fail to encompass resource inventory and availability changes that occur within smart sensor networks and other IoT device groups when resources are relocated or otherwise removed from a device group. Moreover, a lack of group resource coordination may result in underutilization when, as an example, a device is tasked to perform a particular low bandwidth measurement periodically with long intervals between measurements.

SUMMARY

In accordance with the teachings of the present disclosure, disadvantages and problems associated with implementing and utilizing a dynamic population of sensors and other IoT devices within a device group at the edge of a network may be reduced or eliminated.

In accordance with embodiments of the present disclosure, a method of managing a dynamic and potentially diverse population of IoT devices including smart sensor devices and other edge network devices may include detecting a resource request from a requesting device. The resource request may request a particular resource for a particular time interval. The method may include detecting at least one response to the resource request from one or more responding devices and identifying, from the set of responses, a particular response from a particular device to fulfill the resource request.

The method, which may be performed entirely or primarily by a master arbiter of a group of IoT devices, may include broadcasting a confirmation of the particular response and recording, within a virtual resource bank, an indication of the allocation of the particular resource to the resource requestor by the particular device for the particular time interval.

In at least some embodiments, the method includes recording transaction information in a transaction log. The transaction information may include information indicative of the resource request, each of the at least one responses to the resource request, and the confirmation. The transaction information may include timestamp information and other metadata for the resource request, each of the at least one responses to the resource request, and the confirmation. Subsequent analysis of the transaction log may provide insight into specific characteristics of the device group and may lead to modifications of the device group population. Unfulfilled resource requests, as one non-limiting example, may indicate a shortage of a particular resource.

In at least one embodiment, the various resource allocation messages exchanged among IoT devices within a device group may comply with an IoT management protocol or command set that defines aspects of resource requests, responses to resource requests, and confirmations of responses. Detecting a resource request may include, as a non-limiting example, detecting a resource request broadcasted by the requesting device, where the resource request indicates a type of resource requested, a particular start time, a particular duration, and a unique identifier of the requesting device. Similarly, each of the at least one responses to a resource request may include an identifier of the requesting device and an identifier of the responding device, and a confirmation message from the master arbiter may include an identifier of the requesting device, an identifier of the device selected to provide the requested resource, and an indication of the particular time interval.

The virtual resource bank may be structured to support an entry for each of the plurality of devices in a particular device group. Embodiments that support declaration messages may respond to detecting a resource declaration from a new device by creating an entry in the virtual resource bank corresponding to the new device. In other embodiments, virtual resource bank entries may be created when a device responds to a resource request and indicates that a particular resource is available during a particular time slot. Conversely, virtual resource bank entries may be overwritten or removed responsive to detecting that a particular device of the device group is unavailable and any pending allocations of a resource for that device may be reassigned to one or more other devices within the device group.

Localized allocations of IoT device resources may be recorded in the virtual resource bank, which may be implemented, in whole or in part, within the edge gateway device. Local copies of the virtual resource bank, referred to as private resource banks, may be maintained in all or some of the IoT devices. Depending upon the extent of available storage within each IoT device, each private resource bank may include all or some portion of the information in the virtual resource bank.

The IoT devices may include headless devices that lack a conventional human useable interface such as a keyboard, mouse, touchpad, microphone, speaker, or display screen. In some embodiments, the IoT devices may be specifically configured to sense an environmental parameter or other parameter and communicate the sensed parameter to the master arbiter either directly or through intervening IoT devices (peer-to-peer mechanism). In these embodiments, the IoT devices in the device group may form or function as a mesh network wherein each of the IoT devices is communicatively coupled to the edge gateway and wherein a message from any IoT device within the device group is communicated to every other device within the device group.

Technical advantages of the present disclosure may be readily apparent to one skilled in the art from the figures, description, and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features. All drawing figures not expressly identified as prior art encompass and accord with one or more embodiments of inventions disclosed herein.

FIG. 5 illustrates example transactions and corresponding formats for the protocol illustrated in FIG. 4;

FIG. 6 illustrates an example virtual resource bank; and

DETAILED DESCRIPTION

Figure 1:
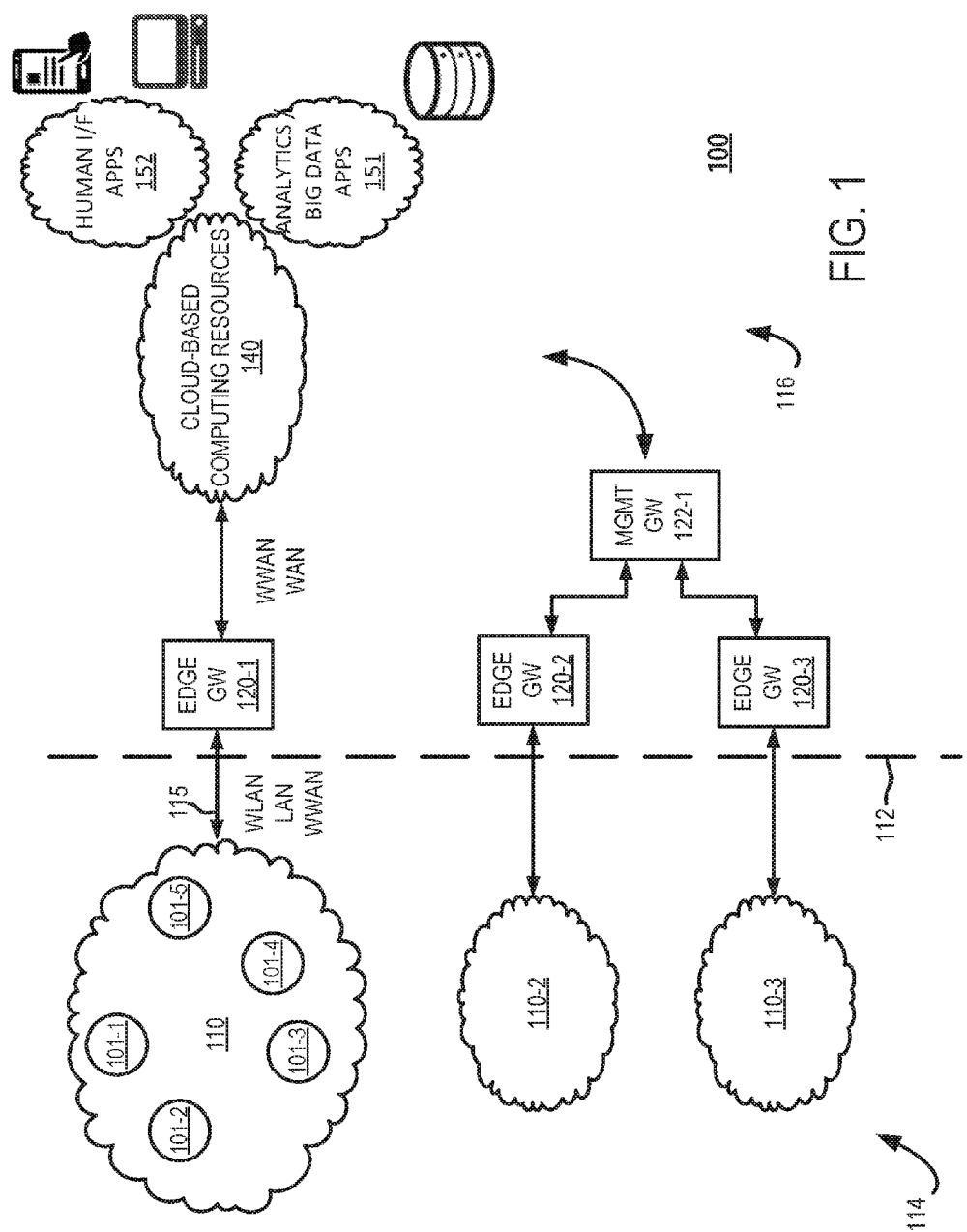
FIG. 1 illustrates a block diagram of a network including a group of IoT devices coupled to cloud-based computing resources through an intervening edge gateway.

Preferred embodiments and their advantages are best understood by reference to FIGS. 1-7, wherein like numbers are used to indicate like and corresponding elements or operations.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

For purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For purposes of this disclosure, information handling systems include IoT devices and edge gateway devices.

In the field of IoT devices and networks, localized sharing of resources by broadcasting available shared capabilities and resources to a local "resource bank" allows for other devices in need of a temporary resource to check out (reserve) and borrow (CPU cycles, memory, temperature sensing, etc.) from the resource bank. Disclosed subject matter enables a group of one or more IoT devices within a mesh network to self-manage, allocate, de-allocate, and share resources by utilizing a resource bank mechanism governed by a master arbitrating device. In at least some embodiments, all resource transactions may be logged and the transaction log may be accumulated over time and evaluated to decide whether to permanently allocate new resources.

FIG. 1 illustrates elements of an example information network 100 featuring a self-managed and dynamically allocable group 110 of IoT devices 101.

In at least some embodiments, IoT devices 101 may exhibit or possess various characteristics that may distinguish, in at least some contexts, IoT devices 101 from information handling systems in general. By way of non-limiting examples, IoT devices 101 may include "headless" devices, i.e., devices lacking in touch and voice input interfaces and video and audible output interfaces. IoT devices may include embedded processors or controllers that execute an embedded operating system or function as firmware-based state machine devices. IoT device wireless connectivity, when supported, may be limited in range and power to local wireless connectivity sufficient to support communication with a neighboring IoT device or with an edge gateway or other type of device group manager. The storage capacity, if any, of at least some IoT devices may be limited.

Nevertheless, in some embodiments, more complex electronic devices capable for performing multiple tasks in parallel, may function as IoT devices with respect to a particular task. A smart phone or tablet device, as non-limiting examples, may function as an IoT device with respect to a particular application or service while also exhibiting characteristics that may be more typical of an traditional information handling system.

The group 110 of IoT devices 101 illustrated in FIG. 1 is located within an edge region 114 of information network 100, located beyond a network edge boundary 112 that delineates the edge region 114 from a cloud region 116. As its name suggests, edge region 114 may represent a portion of information network 100 that is architecturally distant from higher level computational resources represented in FIG. 1 by cloud-based computing resources 140.

Device group 110 includes numerous IoT devices 101, of which individual IoT devices 101-1 through 101-5 are explicitly depicted in FIG. 1. The precise number of IoT devices 101 in device group 110 may vary with time as IoT devices 101 enter into and exit from device group 110.

Any two or more of the IoT devices 101 may represent different instances of a common device or different instances of a common device type. To illustrate with a non-limiting example, any two or more of IoT devices 101 in device group 110 may represent different instances of a particular brand and model sensor or different instances of a specific sensor type, e.g., a temperature sensor, a global positioning system (GPS) receiver, a radio-frequency identification (RFID) tag, and so forth. At the same time, however, any IoT device 101 in device group 110 may represent the only instance of a particular device or the only instance of a particular device type. Thus, the diversity of the population of IoT devices 101 within device group 110 can range from entirely homogeneous to entirely heterogeneous.

In at least some embodiments, IoT devices 101 represent a specific type of information handling system and distinguishing characteristics of IoT devices 101 may be noted when germane. For purposes of this disclosure and unless otherwise indicated, an IoT device refers to an electronic device capable of performing a sensing function and communicating information to at least one other device. With respect to its sensing function, IoT devices 101 may possess an ability to sense or otherwise obtain information pertaining to (a) the environment in which the IoT device is located, (b) a system or machine with which an IoT device is associated, and (c) a human or other living species associated with the IoT device.

With respect to its capacity to communicate information, also referred to herein as the device's connectivity, IoT device 101 may include or support wired connectivity, wireless connectivity, or both under any of a variety of suitable protocols, whether standards based, proprietary, or otherwise. Thus, as examples of wired connectivity, IoT device 101 may support USB, Ethernet, I2C, and LPC. Exemplary wireless protocols that IoT device 101 may support include wireless local area networks (WLAN) and personal area network (PAN) protocols including ZigBee, Wi-Fi, Bluetooth, Bluetooth LE (low energy), and various emerging protocols including Z-Wave and Thread/6LoWPAN as well as wireless wide area network (WWAN) protocols including GSM and CDMA. Communication protocols supported by IoT device 101, whether wireless or wired, may include protocols targeted for low latency and low-frequency transfers of comparatively small amounts of data, at low power, from devices with limited form factors and located in remote locations.

FIG. 1 illustrates a communication connection 115 between device group 110 and edge gateway 120-1 located on or near an architectural edge or boundary 112 of network 100. From this perspective, edge gateway 120-1 may function as a data flow hub or bridge between edge-of-network devices including IoT devices 101 that sense or otherwise extract data from the real world at one extremity of a massively connected info-structure and cloud-based computational resources 140 that analyze real world data to draw conclusions, predict outcomes, and make decisions at the other extremity. In this capacity, edge gateway 120-1 may communicate, whether directly or through one or more intervening IoT devices, with each of the plurality of IoT devices 101 in device group 110.

Edge gateway 120-1 may include native support for a diverse set of application level protocols including, as non-limiting examples intended to emphasize the diversity of suitable applications, industrial automation protocols and instant messaging protocols. The communication protocols supported by edge gateway 120-1 may vary significantly depending upon the application and environment. Nevertheless, edge gateway 120-1 may support any of the previously discussed wireless or wired communication protocols supported by IoT devices 101.

In its capacity as a data flow bridge, edge gateway 120-1 may also perform front end or pre-cloud data management functions including, as non-limiting examples, ingestion, aggregation, filtering, formatting, and caching or local storage. In addition, edge gateway 120-1 may support and provide security, device management, and embedded control functions, as well as front end or edge data analytics.

As illustrated in FIG. 1, edge gateway 120-1 supports and facilitates data flow between IoT devices 101 and one or more cloud-based applications, of which a big data/analytics application 151 and a human interface application 152 illustrated in FIG. 1 are non-limiting examples.

In addition to serving as data conduits, edge gateways 120 may be specifically tasked to monitor and/or control an industrial, manufacturing, or any other suitable process or facility. In these environments and applications, an edge gateway such as edge gateway 120-1 may be implemented as a headless device attached to a wall or other fixture within the applicable facility and configured to monitor or otherwise receive information from IoT devices 101 that perform various data acquisition tasks germane to the applicable process or facility. To illustrate, an edge gateway 120 might be programmed or otherwise tasked to perform fire safety functions. In this example, the edge gateway may receive environmental temperature data from one or more thermal sensors and smoke detection data from one or more chemical sensors. The edge gateway may further include a fire safety module comprising software to perform a rules based decision such as, activating a fire alarm and dialing 9-1-1 upon receiving sensor data indicating fire or smoke.

In some embodiments, the boundaries of device group 110 are defined with respect to the edge gateway 120. In these embodiments, the IoT devices 101 within a device group 110 represent the IoT devices 101 assigned to or otherwise associated with a particular edge gateway 120. In at least some embodiments, device group 110 constitutes a mesh network, in which each individual IoT device 101 may communicate with edge gateway 120 either directly or through one or more neighboring IoT devices in a peer-to-peer fashion. In some embodiments, device group 110 constitutes a fully connected mesh network in which each IoT device 101 can communicate directly with each other IoT device and with edge gateway 120.

FIG. 1 illustrates multiple device groups 110, including device group 110-2 and device group 110-3, each coupled to a corresponding edge gateway 120, including edge gateway 120-2 and edge gateway 120-3 coupled to device group 110-2 and device group 110-3 respectively. FIG. 1 illustrates that two or more edge gateways 120 may be coupled to one or more intermediary gateways including the management gateway 122-1 illustrated in FIG. 1 coupled to edge gateways 120-2 and 120-3, with management gateway 122-1 tasked, for example, to maintain policies enforced by edge gateways 120, to accumulate or otherwise process data from all applicable edge gateways, and so forth. Although FIG. 1 illustrates a single tier of intermediate gateway 122, other embodiments may couple two or more management gateways 122 to a third tier of gateway (not depicted) and so forth with each successive tier of gateway overseeing an increasing number of group devices 110 and IoT devices 101.

Figure 2:
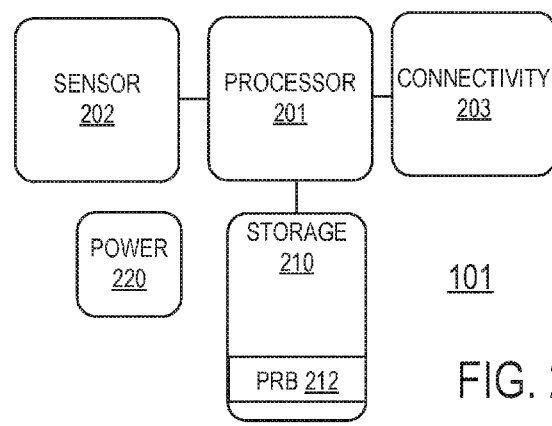
FIG. 2 illustrates a block diagram of an IoT device.

FIG. 2 illustrates elements of an example IoT device 101. The IoT device 101 illustrated in FIG. 2 includes processing capabilities represented by processor 201, data acquisition capabilities, also referred to herein as sensing capabilities, represented by sensor 202, and connectivity capabilities represented by connectivity interface 203. The IoT device 101 illustrated in FIG. 2 also includes a power source 220 and storage 210 coupled to processor 201.

Processor 201 may represent an embedded microcontroller configured with a lightweight or embedded operating system to implement the IoT device as a comparatively simple state machine. The storage 210 illustrated in FIG. 2 is typically comparatively small with respect to other information handling systems, especially information handling systems designed for human interaction and including traditional human usable input and output interfaces.

FIG. 2 illustrates storage 210 as containing a private resource bank 212. The private resource bank 212 may represent an image or local copy of all or a portion of the virtual resource bank 170 illustrated in and described with respect to FIG. 3.

At least some embodiments of IoT device 101 may be designed specifically to communicate with other devices in a machine to machine manner. In other embodiments, however, the elements of the IoT device 101 illustrated in FIG. 2 may be included within a device that has additional processing, storage, and/or I/O resources. As one non-limiting example, a smart mobile device such as a smart phone or a tablet device that has an accelerometer, a global positioning system receiver, or another type of sensor, may function in at least some capacities as an IoT device 101, while retaining the characteristics of a traditional information handling system.

The sensor 202 illustrated in FIG. 2 encompasses any of a wide variety of sensors and sensor types. Examples of sensor types include, without limitation, proximity and presence sensors, temperature or heat sensors, pressure sensors, optical and light sensors, displacement sensors including sensors for detecting angles, distances, speeds, and acceleration, navigational sensors, electrical sensors including current sensors, voltage sensors, magnetic flux sensors, radio signal sensors, chemical sensors, and acoustic and sound sensors. Sensor 202 may be a specifically-purposed sensor designed for use in a particular industry, product, or commercial or industrial process. Automobiles, for example, may include a number of application specific sensors such as a crankshaft position sensor.

In addition to the many types of sensor devices represented by sensor 202, sensor 202 also encompasses many different types of sensing technology including as non-limiting examples electro optical sensors, inductive sensors, biosensors, capacitive sensors, and various types of micro electro mechanical (MEMs) devices. FIG. 2 illustrates and suggests an IoT device 101 that includes functionality for sensing a parameter associated with the environment proximal to the IoT device 101, a larger machine or device to which or within which the IoT device 101 is installed or otherwise located, or a person or another living organism wearing, using, or otherwise associated with the sensor 202.

The connectivity interface 203 illustrated in FIG. 2 encompasses both wireless and wired interfaces. As suggested previously, IoT device 101 may have resources for generating and/or receiving radio frequency signals. Connectivity interface 203 may include support for various pervasive wireless protocols including wireless protocols optimized for or pervasive within industrial automation processes as well as wireless and wired protocols commonly found in consumer devices and applications.

Regardless of the specific configuration or function of an IoT device 101, IoT device 101 represents a computational resource that may be employed by system 100. As discussed previously, a device's resource may be utilized either rarely or frequently and either predictably or unpredictably. In addition, because at least some IoT devices 101 are configured with a minimal or lightweight set of resources, traditional information handling system management solutions may be unsuitable for use in conjunction with IoT device 101. In at least some embodiments, however, a collection of IoT devices 101 may self-manage and cooperatively allocate resources by exchanging a relatively simple set of messages coordinated by a virtual arbiter that monitors and logs transactions to enable and allocate devices and device resources as needed.

Figure 3:
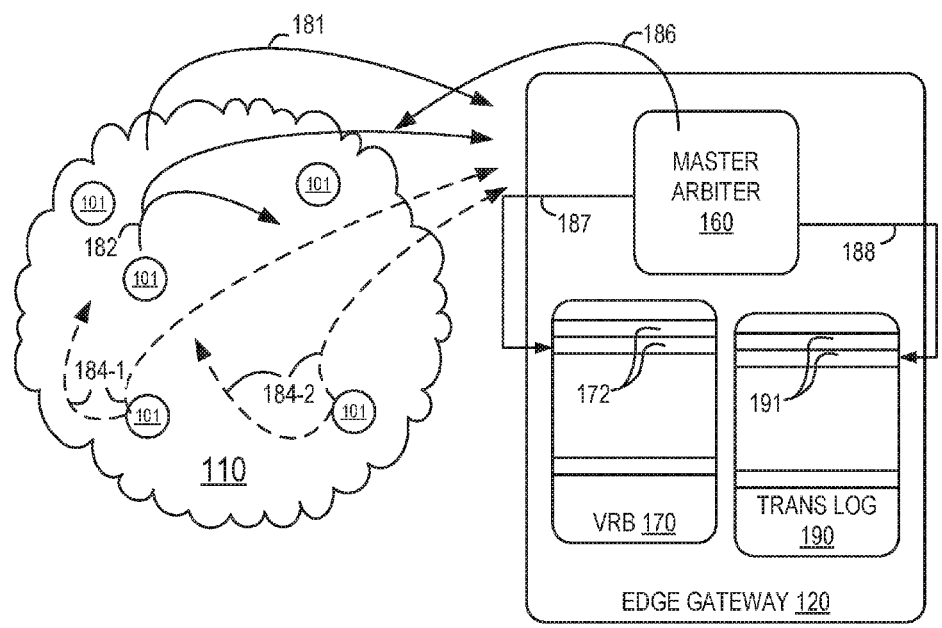
FIG. 3 illustrates a block diagram of a group of IoT devices employing a virtual resource bank and a master arbiter to process resource requests and locally manage resource allocations.

FIG. 3, which illustrates selected edge-of-network elements employed to enable a collection of IoT devices 101 to monitor and manage their collective resources, includes a device group 110, a virtual resource bank 170, a master arbiter 160, and a transaction log 190. Device group 110 includes a plurality of IoT devices 101 configured with sensing, connectivity, processing, and storage capabilities sufficient to issue resource requests, receive resource requests from other devices, send responses to resource requests, receive responses to resource requests from other devices, and receive messages, including confirmation messages from master arbiter 160. In at least some embodiments, virtual resource bank 170 and master arbiter 160 enable a diverse and dynamic collection of specifically purposed devices to self-manage, allocate, de-allocate, and share resources without a formalized network management protocol and corresponding hardware.

In at least one embodiment, master arbiter 160 monitors resource requests and responses to and from IoT devices 101, resolves contention when two or more resource requests or responses to resource requests conflict, sends confirmation messages confirming allocations of IoT device resources, and records confirmed allocations of resources in virtual resource bank 170. Master arbiter 160 may also record all or selected subsets of all resource allocation messages exchanged between IoT devices 101 in transaction log 190 to support subsequent analysis of transaction patterns and to provision device group 110 with the most frequently requested resources.

FIG. 3 illustrates example resource management messages supported by and exchanged between the IoT devices 101 and master arbiter 160 implemented within an edge gateway 120. The example resource management messages illustrated in FIG. 3 include a resource declaration message 181, a resource request message 182, a response message 184, and a confirmation message 186 although the specific messages and message formats supported is an implementation detail that may include more, fewer, or different messages.

The IoT devices 101 illustrated in FIG. 3 may broadcast or otherwise send resource declaration messages 181 to inform the device group 110 and master arbiter 160 of resources that the particular IoT device 101 may have. Resource declaration messages 181 are optional messages that need not be supported in all implementations. In the absence of resource declaration messages, master arbiter 160 may discover IoT devices and their corresponding resources when, for example, an IoT device 101 resource broadcasts a response message 184 to a pending resource request message 182.

In embodiments that support resource declaration messages, an IoT device 101 may broadcast a resource declaration message 181 when the device first becomes a member of device group 110. An IoT device 101 may become a device group member when, as examples, the device is powered-on, activated, or otherwise first instantiated at a location that is within a spatial or geographic domain of an edge gateway corresponding to master arbiter 160. In another example, a mobile IoT device 101 may move from one device group 110 to another and may broadcast a resource declaration upon entering a new device group.

Master arbiter 160 may detect resource declaration messages 181 and update virtual resource bank 170 to reflect newly available resources when IoT devices 101 first enter a device group 110 or first activate within a device group 110. Virtual resource bank 170 may include one or more entries 172 corresponding to each resource declaration detected so that virtual resource bank 170 may represent an inventory or state of resources available within device group 110 at any point in time. To verify the presence of IoT devices 101 listed in virtual resource bank 170, master arbiter 170 may poll or otherwise prompt IoT devices 101 to verify their continued presence. Alternatively, an IoT device 101 may periodically push or post an indication of its continued presence to master arbiter 160. If master arbiter 160 determines that a previously existing IoT device 101 is no longer responding to polls or no longer posting presence messages, master arbiter 160 may remove the applicable entry in virtual resource bank 170.

In addition to providing an instantaneous view of resource availability, virtual resource bank 170 may include or reflect resource availability in the future. In embodiments that support resource declaration messages, an IoT device 101 may include, as part of a resource declaration message 181, allocation information indicating intervals of time when the particular resource is allocated. For example, an IoT device 101 that, when activated, is tasked to sense, record, and communicate the value of a particular parameter once every six hours, may include information reserving the device's resource during four equally spaced and equal-length intervals each day where the length of each interval may depend upon a variety of factors. Master arbiter 160 may record allocation information pertaining to a resource declaration message 181, including any allocations indicated within the declaration.

For embodiments in which resource declarations are not employed, the virtual resource bank 170 may be used primarily or exclusively to record inter-device resource allocations associated with confirmed responses to resource requests.

Thus, virtual resource bank 170 may include information indicating the availability of resources presently and at any point in time in the near or long term future. In some embodiments, the virtual resource bank may maintain a schedule of a particular device's allocations regardless of whether the device itself possesses any form of clock or calendar capability. In this manner, the master arbiter 170 may extend the functionality of at least some IoT devices 101 to include a resource allocation calendar.

Although not expressly depicted in FIG. 3, an IoT device 101 may have sufficient storage and other resources to maintain a local copy, referred to herein as a private resource bank, of all or some of virtual resource bank 170. Although embodiments of IoT device group 110 that maintain localized private resource banks within any one or more IoT devices 101 may require resources to ensure some degree of resource bank synchronization, the increased complexity may be justified by improvements in performance relative to embodiments that do not employ private resource banks, whether due to lack of sufficient IoT device capability or other reasons.

Master arbiter 160 is shown in FIG. 3 receiving a resource request message 182 from IoT device group 110, i.e., from an IoT device 101 within IoT device group 110. In embodiments not illustrated in FIG. 3, a resource request message 182 may originate from a device external to device group 110, in which case the external device may communicate either directly with the IoT devices 101 in device group 110 or through master arbiter 160, which may be configured to coordinate resource requests from external devices with resources available in device group 110. As discussed in more detail with respect to FIG. 4, FIG. 5, and FIG. 6, resource request message 182 may include a unique identifier of the requesting device, an indication of the requested resource, and an indication of when and for how long the resource is requested.

In some embodiments, IoT devices 101 may broadcast resource requests 182 using, as an example, Wi-Fi or another suitable wireless local area network communication protocol and each IoT device 101 within device group 110 may be capable of detecting each resource request message 182 broadcast by another IoT device within the device group 110. In other embodiments, at least some IoT devices 101 may lack WLAN or similar broadcast connectivity and, in these embodiments, the IoT devices 101 may constitute a mesh network configured wherein a message sent by one IoT device 101 within the device group is propagated to every other device 101 in the device group via one or more propagation paths. In these embodiments, resource management and allocation may be supported without imposing any particular connectivity requirements on the devices 101 within the device group 110.

FIG. 3 further illustrates one or more IoT devices 101 in device group 110 broadcasting resource responses 184, two of which are explicitly depicted as resource response message 184-1 and resource response message 184-2. Resource responses 184 communicate availability, by the sender, of a resource requested in a resource request message 182 at the time indicated in the resource request message 182. FIG. 3 illustrates a case in which multiple IoT devices 101 within device group 110 have a resource requested by another device available at the time the other device requested the resource. A resource response message 184 may include an identifier of the resource indicating resource availability and an identifier of the requesting resource. In the case illustrated in FIG. 3, which includes multiple responses (184-1 and 184-2), master arbiter 160 detects both of the responses 184-1 and 184-2 and recognizes that both responses 184 are in response to the same resource request message 182. Master arbiter 160 must therefore select one of the two resource responses 184 and broadcast a confirmation message 186 indicating which of the two resource responses 184 has been accepted. Master arbiter 160 may select between multiple resource responses 184 using any suitable selection algorithm or rule set. Resource declarations may include indications of varying degrees of performance capabilities associated with particular resources and, in these embodiments, arbiter 160 may select and confirm a particular resource response message 184 based, at least in part, on a performance parameter associated with the requested resource.

FIG. 3 further illustrates master arbiter 160 issuing a virtual resource bank update 187 to the virtual resource bank 170 to reflect an allocation of a resource from the IoT device 101 that issued the resource response message 184 that was ultimately confirmed by master arbiter 160. Any one or more of the IoT devices 101 in device group 110 that maintain a private resource bank (not depicted in FIG. 3) may update their private resource bank upon detecting the confirmation message 186 from master arbiter 160. In addition, FIG. 3 illustrates master arbiter 160 issuing logged transaction commands 188 to record transactions corresponding to each of the messages 181 through 186 in corresponding entries 191 of transaction log 190.

Figure 4:
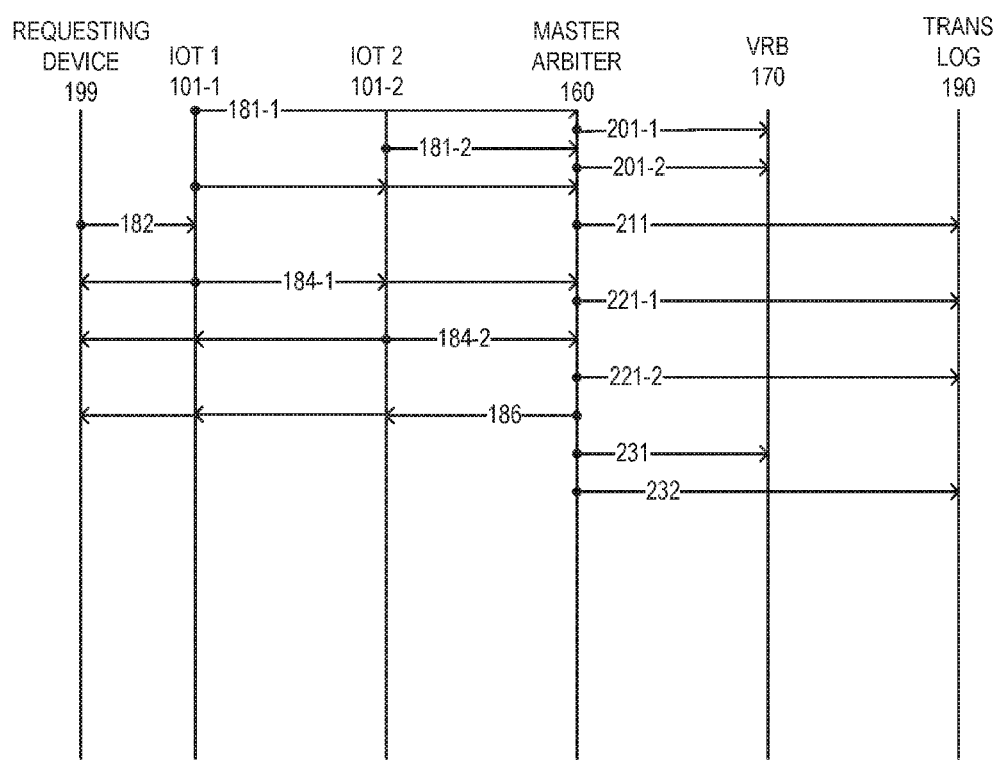
FIG. 4 illustrates a resource allocation method and protocol by which IoT devices within a device group, in conjunction with a virtual resource bank and a master arbiter, process resource requests and manage resource allocations.

FIG. 4 illustrates the sequence described above with respected to FIG. 3 using a line and arrow format emphasizing the resource allocation messages generated as well as the senders and recipients of the messages.

In at least one embodiment, master arbiter 160, in addition to maintaining virtual resource bank 170, logs the various resource allocation messages or transactions transmitted to and from the IoT devices 101. These transaction messages may include, depending upon the implementation, resource declaration messages, resource requests, whether originating from within device group 110, from another network edge device group, or from a resource external to edge region 114.

Implementing virtual resource bank 170 and master arbiter 160 as described enables an ad hoc group of IoT devices 101 to coordinate resource allocation and improve resource utilization. In conjunction with subsequent efforts to analyze transaction logs, the resource allocations methods described herein can provide insight into the relationship between available resources and requested resources that might suggest longer term adjustments in resource distribution. In addition, virtual resource bank 170 might be exposed to external devices so that external devices might view the device group 110 as a single object encompassing the resources of all IoT devices 101 within the device group.

FIG. 4 illustrates IoT device 101-1 issuing resource declaration message 181-1 and resource declaration message 181-1 being delivered to master arbiter 160. The resource declaration message 181-1 may be broadcast by IoT device 101-1 in the same manner that IoT device 101-1 would broadcast any other resource allocation message. In the embodiment illustrated in FIG. 4, resource declaration message 181-1 may include a message type field identifying the message as a resource declaration and, in at least some embodiments, resource declarations may be ignored by other IoT devices 101 and acted upon only by master arbiter 160. FIG. 4 further illustrates master arbiter 160 updating the virtual resource bank 170 to reflect the availability of resources indicated in the resource declaration message 181-1. Similarly, a second IoT device 101-2 is illustrated broadcasting a resource declaration message 181-2 which is received by master arbiter 160. Master arbiter 160 then updates, in transaction 201-2, the virtual resource bank 170.

FIG. 4 illustrates a requesting device 199 broadcasting a resource request message 182. FIG. 4 illustrates the broadcasting of resource request message 182 by illustrating resource request message 182 terminating at multiple devices including IoT device 101-1, IoT device 101-2, and master arbiter 160, to emphasize that the resource request message 182 is received by each of the IoT devices in device group 110. The device group 110 illustrated in FIG. 4 may represent a fully enabled mesh network in which each IoT device 101 receives messages from each other device directly. Other embodiments of device group 110 may comprises less than fully enabled mesh networks, in which any particular IoT device 101 may be limited to propagate a resource request message 182 or any other message to one or a limited number of other IoT devices 101 and this propagation of a resource request or other message may continue until each of device 101 within device group 110 receives the applicable message.

FIG. 4 illustrates master arbiter 160 performing a transaction log update 211 to record within transaction log 190 the resource request message 182. FIG. 4 illustrates an example in which two IoT devices 101 respond to resource request message 182. IoT device 101-1 broadcasts resource response message 184-1 which is broadcast to requesting device 199, other IoT devices 101, including IoT device 101-2, and master arbiter 160. FIG. 4 illustrates master arbiter 160 issuing a transaction log update 221-1 to log the resource response message 184-1. IoT device 101-2 is illustrated issuing a second resource response message 184-2 which is broadcast to requesting device 199, first IoT device 101-1 as well as other IoT devices in device group 110, and master arbiter 160. Master arbiter 160 logs the second resource response as indicated by transaction log update 221-2.

Because multiple IoT devices 101 responded to resource request message 182, master arbiter 160 selects one of the two responses 184 and confirms the corresponding resource allocation by broadcasting a confirmation message 186 which is illustrated being received by each of the IoT devices within device group 110 as well as by the requestor 199. Master arbiter 160 is illustrated broadcasting a virtual resource bank update 231 to reflect the confirmed resource response and to allocate the corresponding resource to the requester. FIG. 4 further illustrates master arbiter 160 logging (232) the confirmation message 186 in transaction log 190. Not depicted in FIG. 4, each of the IoT devices 101-1 and 101-2 may update its private resource bank following confirmation message 186 analogous to master arbiter 160 updating virtual resource bank 170 in with the resource bank update 231.

FIG. 5 illustrates example formats for the resource declaration messages of FIG. 4. The illustrated messages and formats may form the nucleus of a protocol for managing and allocating resources among a group of IoT devices.

An example resource declaration message 181 illustrated in FIG. 5 includes a message type field 242 identifying the message as a resource declaration message, a resource type field 243 identifying the type of resource being declared, for example, storage resource, sensor resource, etc., and a resource identification field 244 containing a unique identifier for the resource making the declaration.

FIG. 5 also illustrates an example resource request message 182 that includes a message type field 252 identifying the message as a resource request, a resource requested field 253 indicating the type of resource requested by the requesting device, a requestor identification field 254 containing a unique identifier of the requesting device, and a time field 255, including a start time field 256 and a duration field 257 defining the interval of time for which the applicable resource is requested.

An example response message 184, generated by an IoT device 101 in response to a resource request message 182, indicates and identifies a resource available to fulfill a resource request message 182. The response message 184 illustrated in FIG. 5 includes a message type field 262 identifying the message as a response, a provider identification field 263 containing a unique identifier of the IoT device 101 offering to provide the requested resource at the requested time, and a requestor identification field 264 containing the unique identifier of the device requesting the resource, as obtained from identification field 254 of the applicable resource request message 182.

The example confirmation message 186 illustrated in FIG. 5 includes a message type field 272 identifying the message as a confirmation message, a provider identification field 273 containing the unique identifier of the resource selected by master arbiter 160 to provide the resource to the requestor at the requested time, a requestor identification field 274 containing the unique identifier of the requesting resource, and a time field 275 indicating the time interval during which the identified provider will provide the requested resource to the requesting device. The time field 275 illustrated in FIG. 5 is structured with a start time field 276 and a duration field 277 in the same manner as the time field 215 of the example resource request message 182 although the time field 275 is not strictly required to match the formation of time field 215 if the protocol and the applicable devices support multiple formats for indicating time intervals.

The master arbiter 160 may be configured to respond to detecting a resource declaration message 181 by adding an entry in the virtual resource bank 170. FIG. 6 illustrates an example virtual resource bank 170 including individual resource bank tables 171 corresponding to each type of resource. A first resource bank table 171-1 may, as an example, correspond to a processing resource while a second resource bank table 171-2 may correspond to a storage or memory resource. The number of tables 171 within virtual resource bank 170 may vary with the implementation and may accommodate any number of suitable types of processing resources. In the context of IoT devices 101 within a device group 110, the resource types may include, in addition to processing resources and storage resources, connectivity resources and sensing resources. Thus, virtual resource bank 170 may include individuals tables for processing resources, storage resources, connectivity resources, and sensing resources.

Each table 171 of virtual resource bank 170 illustrated in FIG. 6 includes an entry 172 for each IoT device 101 that has broadcasted or declared a resource of the applicable type. Each resource bank table 171 illustrated in FIG. 6 also includes an optional summary entry 175 to indicate availability of particular types of resources within the device group 110 as a whole.

Each entry 172 in each virtual resource bank table 171 includes an identification field 174 uniquely identifying the applicable resource and fields 176 indicating intervals of time corresponding to any allocations of the resource. The fields 176 illustrated in FIG. 6 specify the applicable interval of time with a first field 177 indicating a starting time and a second field 178 indicating a duration. The starting time field 177 may indicate, in addition to a time of day, a day, month, and year. Although the time intervals illustrated in FIG. 6 are defined by a starting time and a duration, intervals of time may be specified by any appropriate parameters including, as examples, a starting time and an ending time or an ending time and a duration.

In some embodiments, the virtual resource bank 170 may be fully or partially replicated in all or some of the IoT devices 101 within device group 110. Replication or duplication of the resource bank information within each of the IoT devices 101 may facilitate restoration of a particular state should one or more of the individual devices cease to function or exit the device group 110. In addition, local replication and duplication of the virtual resource bank may reduce latency or delay when IoT devices 101 communicate in a peer to peer or machine to machine manner.

Figure 7:
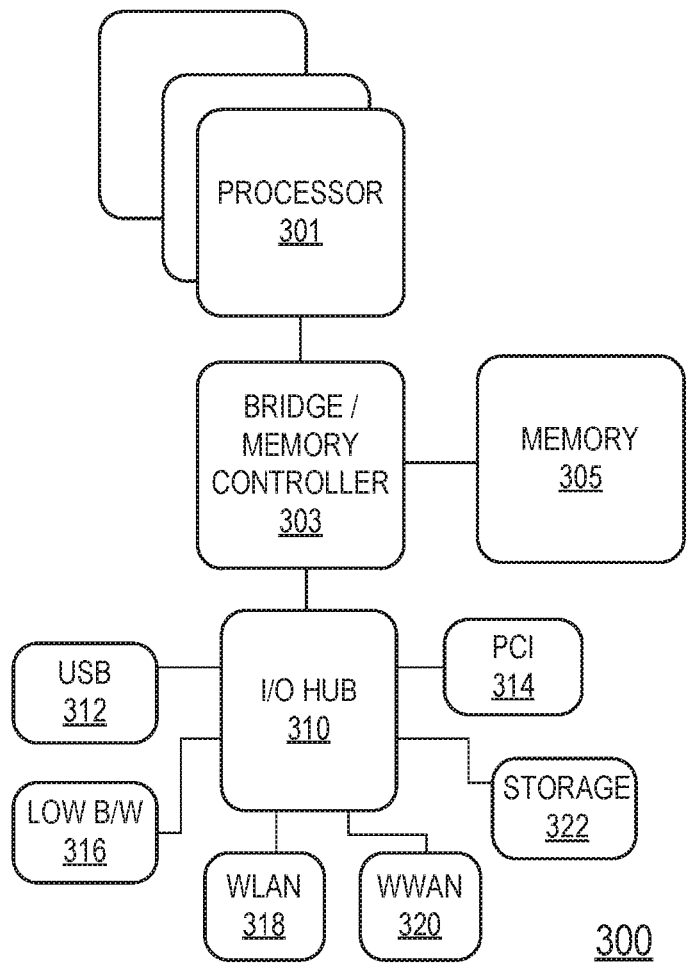
FIG. 7 illustrates an information handling system suitable for use as an edge gateway device.

FIG. 7 illustrates elements of an information handling system 300 that may be suitable for use as the edge gateway 120 illustrated in FIG. 1 and FIG. 2. The information handling system 300 illustrated in FIG. 7 includes one or more general-purpose processors 301 coupled to a bridge/memory controller 303. Bridge/memory controller 303 controls a memory 305 and communicates with an I/O hub 310. Consistent with a data conduit function that an edge gateway or another type of gateway device may perform in a particular configuration, the I/O hub 310 of the information handling system 300 illustrated in FIG. 7 supports a diverse set of I/O controllers and adapters.

The I/O hub 310 of FIG. 7 includes a USB controller 312 for high-speed serial communication, a PCI controller 314 for communication with PCI devices, and a low bandwidth controller 316 for providing low bandwidth protocols including, as examples, LPC, SPI, and I2C. A WLAN controller 318 provides support for various local and personal area network protocols including, as non-limiting examples, Wi-Fi, Bluetooth, and Zigbee while a WWAN controller 320 provides support for GSM and/or CDMA communication. The information handling system 300 of FIG. 7 further includes a storage adapter 322 that supports one or more mass storage protocols including, as examples, SCSI, SATA, and NVMe. Any of the elements shown in FIG. 7 may encompass two or more distinct controllers or adapters. Conversely, any group of two or more elements shown separately in FIG. 7 may be integrated within a single semiconductor device, chip set, or printed circuit board.

Characteristic of at least some headless gateway devices, the information handling system 300 of FIG. 7 reflects an absence of conventional human I/O adapters and controllers including an absence of video/graphics adapters, keyboard, mouse, and touchpad controllers, microphone and speaker transducers, or an audio codec. Other embodiments of information handling system 300 may include any or all of these elements.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method of managing resources, comprising:
   detecting a resource request, from a requesting device, requesting a particular resource for a particular time interval;
   responsive to detecting at least one response to the resource request from responding devices, identifying a particular response from a particular device to fulfill the resource request;
   broadcasting a confirmation of the particular response; and
   recording, in a virtual resource bank, an allocation of the particular resource by the particular device for the particular time interval.

2. The method of claim 1, further comprising:
   recording, in a transaction log, transaction information comprising information indicative of:
   the resource request;
   each of the at least one responses to the resource request; and
   the confirmation.

3. The method of claim 2, wherein the transaction information includes timestamp information for the resource request, each of the at least one responses to the resource request, and the confirmation.

4. The method of claim 2, further comprising:
   modifying available resources in accordance with a resource need indicated by the transaction log.

5. The method of claim 1, wherein detecting the resource request includes:
   detecting a resource request broadcasted by the requesting device, wherein the resource request indicates a type of resource requested, a particular start time, a particular duration, and a unique identifier of the requesting device.

6. The method of claim 5, wherein each of the at least one responses includes:
   the identifier of the requesting device; and
   an identifier of the responding device.

7. The method of claim 6, wherein the confirmation includes:
   the identifier of the requesting device;
   the identifier of the particular device; and
   an indication of the particular time interval.

8. The method of claim 1, wherein the virtual resource bank includes an entry for each of a plurality of devices in a device group and wherein the method includes:
   detecting a resource declaration from a new device;
   including the new device within the device group by creating an entry in the virtual resource bank corresponding to the new device; and
   responsive to detecting a specific device of the device group is unavailable, re-assigning allocations associated with the specific device to at least one different device within the device group.

9. The method of claim 8, wherein the plurality of devices in the device group comprise Internet of things (IoT) devices and wherein recording the allocation in the virtual resource bank comprises recording the allocation in a virtual resource bank of an edge gateway configured to communicate with each of the plurality of devices in the device group.

10. The method of claim 9, wherein the method further comprises:
maintaining private resource banks in each of the IoT devices, wherein a private resource bank includes at least a portion of the information in the virtual resource bank.

11. The method of claim 9, wherein the IoT devices comprise headless devices configured to sense a parameter and communicate the parameter to another device.

12. The method of claim 11, wherein the IoT devices in the device group are configured as a mesh network wherein each of the IoT devices is communicatively coupled to the edge gateway and wherein a message from any IoT device within the device group is communicated to every other device within the device group.

13. An information handling system, comprising:
an edge gateway configured to facilitate flow of data from a plurality of edge network devices within a device group to cloud-based computing resources, wherein the edge gateway includes:
a processor;
a plurality of communication interfaces; and
storage, including non-transient processor executable instructions for causing the processor to perform operations comprising:
detecting a resource request, from a requesting device, requesting a particular resource for a particular time interval;
responsive to detecting at least one response to the resource request from responding devices, identifying a particular response from a particular device to fulfill the resource request;
broadcasting a confirmation of the particular response; and
recording, in a virtual resource bank, an allocation of the particular resource by the particular device for the particular time interval.

14. The information handling system of claim 13, wherein the operations include:
recording, in a transaction log, transaction information comprising information indicative of:
the resource request;
each of the at least one responses to the resource request;
the confirmation as entries in a transaction log; and
timestamp information for the resource request, each of the at least one responses to the resource request, and the confirmation.

15. The information handling system of claim 13, wherein the virtual resource bank includes an entry for each of a plurality of devices in a device group and wherein the operations include:
detecting a resource declaration from a new device;
including the new device within the device group by creating an entry in the virtual resource bank corresponding to the new device; and
responsive to detecting a specific device of the device group is unavailable, re-assigning allocations associated with the specific device to at least one different device within the device group.

16. A non-transient computer readable medium including processor-executable instructions that when executed by the processor cause the processor to support Internet of things (IoT) management protocol instructions, comprising:
a resource request instruction enabling a requesting device to request a particular resource for a particular time interval from a device group comprising a plurality of IoT devices;
a response instruction enabling IoT devices in the device group to respond to the resource request, wherein the response instruction identifies the requesting device and a particular IoT device to fulfill the resource request; and
a confirmation instruction enabling a master arbiter of the device group to identify a particular response to a resource request and to record, in a virtual resource bank, an allocation of the particular resource by the particular device for the particular time interval.

17. The non-transient computer readable medium of claim 16, wherein the operations include:
recording, in a transaction log, transaction information comprising information indicative of:
the resource request;
each of the at least one responses to the resource request;
the confirmation as entries in a transaction log; and
timestamp information for the resource request, each of the at least one responses to the resource request, and the confirmation.

18. The non-transient computer readable medium of claim 16, wherein the virtual resource bank includes an entry for each of a plurality of devices in a device group and wherein the operations include:
detecting a resource declaration from a new device;
including the new device within the device group by creating an entry in the virtual resource bank corresponding to the new device; and
responsive to detecting a specific device of the device group is unavailable, re-assigning allocations associated with the specific device to at least one different device within the device group.

19. The non-transient computer readable medium of claim 16, wherein the operations include:
maintaining private resource banks in each of the IoT devices, wherein each private resource bank includes at least a portion of the information in the virtual resource bank.

20. The non-transient computer readable medium of claim 16, wherein the master arbiter is implemented in an edge gateway configured to communicate with each of the plurality of IoT devices in the device group.

* * * * *